United States Patent [19]
Hajec

[11] 3,731,756
[45] May 8, 1973

[54] GOLF CART AND CONTROL THEREFORE

[76] Inventor: Chester S. Hajec, 2195 West Hwy. 36, Roseville, Minn. 55113

[22] Filed: Oct. 29, 1970

[21] Appl. No.: 85,129

[52] U.S. Cl. ............... 180/6.5, 180/19 R, 280/DIG. 5
[51] Int. Cl. ............................................. B62d 11/04
[58] Field of Search ................ 180/19 H, 19 S, 19 R, 180/6.5, 12, 13; 280/DIG. 5

[56] References Cited

UNITED STATES PATENTS

| | | | |
|---|---|---|---|
| 3,247,923 | 4/1966 | Cornell | 180/19 R |
| 2,962,106 | 11/1960 | Burnside | 180/19 H |
| 1,537,183 | 5/1925 | O'Hara | 180/6.5 UX |
| 2,676,032 | 4/1954 | Stegman | 180/12 X |
| 2,296,859 | 9/1942 | Le Tounneau | 180/12 |
| 2,879,858 | 3/1959 | Thomas | 180/19 H |
| 3,481,417 | 12/1969 | Jarret et al. | 180/6.5 |

*Primary Examiner*—Leo Friaglia
*Assistant Examiner*—John A. Pekar
*Attorney*—Dugger, Peterson, Johnson & Westman

[57] ABSTRACT

A motorized cart for use for carrying golf clubs and the like which has a power unit and a trailing load support member. The power unit includes drive motors which are electrically driven from storage batteries kept in the load support unit, and which will steer the vehicle in response to movements of a cord attached to the person using the cart so that it will follow him exactly by using differential steering for the two wheel power unit which leads the trailing load support unit.

11 Claims, 10 Drawing Figures

Patented May 8, 1973

INVENTOR.

CHESTER S. HAJEC

BY

Dugger, Peterson, Johnson & Westman

Patented May 8, 1973

INVENTOR.
CHESTER S. HAJEC
BY
Dugger, Peterson, Johnson & Westman fig. 5 fig. 6

INVENTOR.
CHESTER S. HAJEC fig.7

Patented May 8, 1973 3,731,756

INVENTOR
CHESTER S. HAJEC
BY
Dugger, Peterson, Johnson & Westman fig.10

GOLF CART AND CONTROL THEREFORE

BACKGROUND OF THE INVENTION

1. Field of the Invention

The present invention relates to self propelled trailing carts for use for carrying golf clubs or similar articles.

2. Prior Art

Trailing carts for golf clubs that are motorized are quite well known in the art. Self steering carts have also been developed, but have many operational difficulties because of the mechanical steering linkages utilized and the inability of the unit to follow the operator precisely. For example, the patent to Cornell, U.S. Pat. No. 3,247,923 shows a motorized golf cart which has a single front steering wheel and a pair of rear drive wheels, and which is battery operated. The unit follows the operator through the use of a cord, but has only two speeds of operation and the steering depends upon mechanical linkages which gives insufficient steering, erratic operation, and will cause swerving of the cart as it moves along.

SUMMARY OF THE INVENTION

The present invention relates to a motorized golf cart or the like which has controls for stepless speed regulation and which utilizes a cord control that follows the user, and wherein the speed is dependent upon the extension of a cord. Turning is accomplished by differential electrical controls of the drive wheels initiated by sensing the direction that the control cord or cords are extending from the control unit.

The drive unit is positioned immediately behind the operator, and a single trailing support unit is mounted about a king pin axis to the drive unit. The drive unit has two wheels with an electric drive motor for each of the wheels. Control of these motors is accomplished through the use of a rheostat wired to the power source, and controlled by a flexible cord attached to or carried by the operator. Steering control can be by switches that are opened when the control cord extends at an angle to the vehicle and drive the drive wheels at different speeds to cause the vehicle to turn. In a modified form, two rheostats that give differential speed between the wheels of the drive unit are used. The electrical steering gives accurate, safe steering of the unit. The device can be made so that it will follow quite closely to the operator's footstep path, and will operate at a normal walking speed. The device is simple to make, and is much easier to control than previous mechanical type steering devices.

The motors are made so that they can have dynamic braking if desired to slow down the cart. The carts themselves do not have locking or mechanical brakes but only electrical dynamic braking.

BRIEF DESCRIPTION OF THE DRAWINGS

FIG. 7 is an electrical schematic diagram representative of the electrical circuit for driving the drive motors of the present invention;

DESCRIPTION OF THE PREFERRED EMBODIMENTS

A motorized cart illustrated generally at 15 comprises a power unit 16, and a trailing load carrying unit 17.

The power unit has a large housing 18 which is used for supporting drive wheels 19 and 20, respectively, on opposite sides of the power unit and which is also used for mounting the electrical controls utilized in driving the cart of the present invention. The housing has a cover 21 which is removable to permit access to the interior of the unit, and which is fastened on in any suitable manner. The housing can be made up of molded plastic or fiberglass, or any other desired material.

The trailing unit 17, as shown, includes a frame 22, and a single center mounted idler support wheel 23 is rotatably mounted on a suitable axle 24 at the rear portions of the load carry unit.

The load carrying unit, as shown, has a forward compartment 27 which is used for housing a battery that powers the unit, and suitable electrical wires then can run from this housing over to the power unit 16, and in addition the load carrying unit, as shown, has a support illustrated generally at 28 to support a bag 29 for carrying golf clubs 30. The base end of the golf bag is supported on the support 28, and the upper end is held in a saddle 31 mounted onto a frame member 32 that extends upwardly and forwardly with a suitable detachable strap 33. Thus the golf bag can be held securely on the load carrying unit.

The frame support member 32 that extends upwardly and forwardly is fixed to the frame 22, and has a yoke 34 adjacent the upper end thereof. The yoke 34 in turn has a king pin 35 fixed thereto. The king pin 35 in turn is rotatably mounted in a suitable king pin support 36 at the top of the housing 18 for the power unit 16.

The rotatable mounting of king pin 35 permits the power unit 16 to pivot about the king pin axis with respect to the load support unit 17, and this makes the vehicle act like a semitrailer. In addition, in order to give stability and take some of the load off the king pin, a tension rod 37 is pivotally mounted in a suitable manner to the frame 22 of the trailing unit and is also pivotally mounted at its forward end to a bottom wall of the housing 18 for the power unit 16. The pivotal mounting of the tension rod 37 is made with an end portion 38 which extends uprightly and is substantially coaxial with the pin 35 so that the power unit can pivot about this axis with respect to the trailing unit. The tension rod 37 prevents the bottom parts of the power unit and the load carrying unit from separating when high loads are placed on the trailing unit.

As can be seen, the frame member 32 slopes upwardly and forwardly and carries part of the weight of the golf clubs directly above the king pin so that the power unit also supports a good portion of the load, which is a desirable feature.

Figure 4:
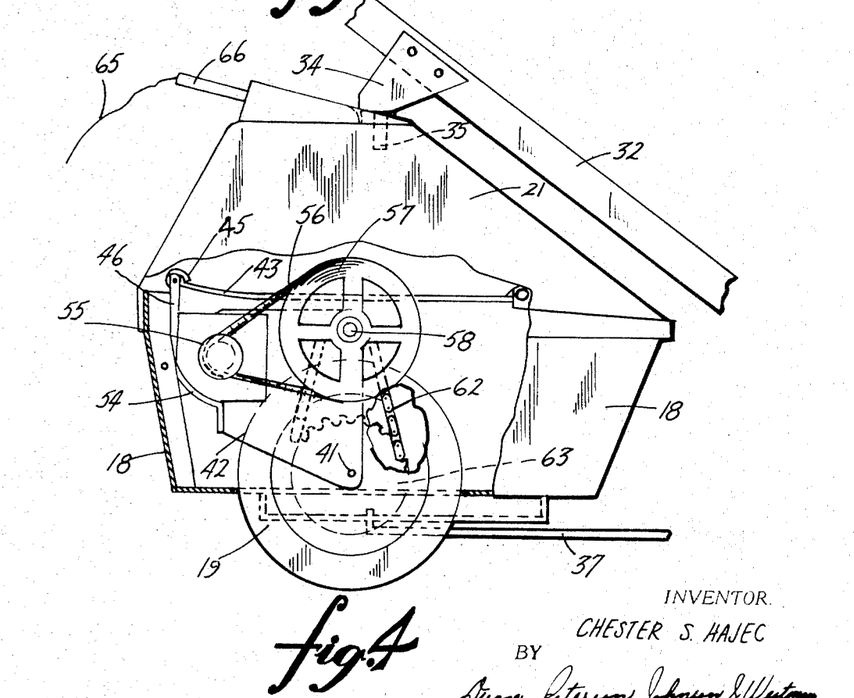
FIG. 4 is a side elevational view of the device of FIG. 1 shown with parts broken away to illustrate details of the vehicle drive wheel suspension.
Figure 6:
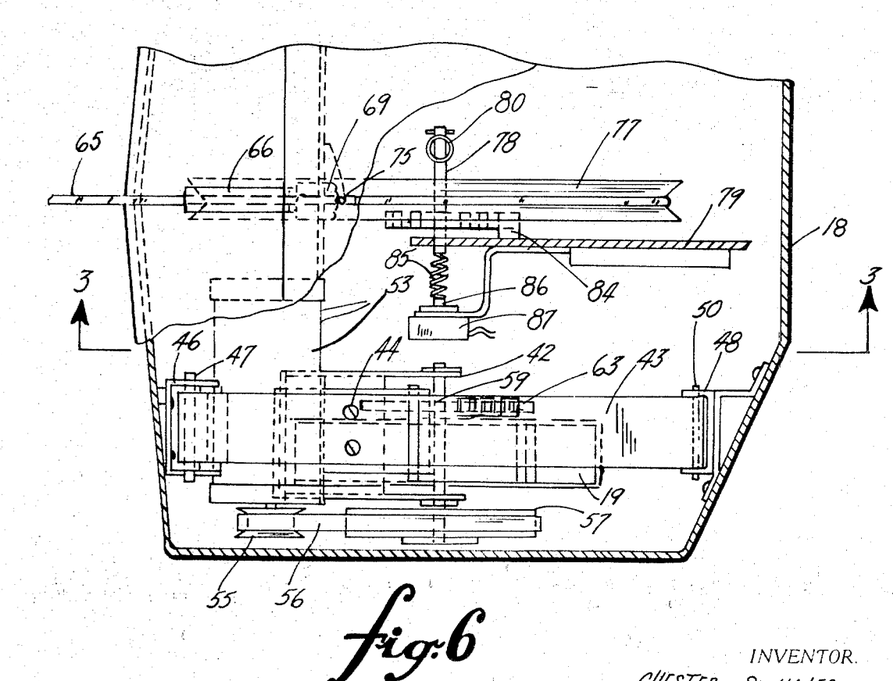
FIG. 6 is a top plan view of the power unit with parts broken away to show interior details, said unit being symmetrical about its center line.

A typical mounting for the drive wheels 19 and 20 is shown in FIGS. 4 and 6. As can be seen, the lower portion of the housing 18 is used for mounting these drive wheels, and the wheels protrude or extend downwardly through openings in the bottom wall of the housing adjacent the side edges of the housing. As shown, the drive wheel 19 has a suitable tire on it, and a wheel member that is rotatably mounted on a shaft or axle 41. The shaft 41 in turn is mounted in a suitable U-shaped bracket 42 which has legs that extend downwardly on opposite sides of the wheel 19, as shown. Wheel 20 on the opposite side of the unit also has a mounting bracket, and is merely a mirror image of the described mounting device.

As shown, the shaft 41 goes through both legs of the bracket 42, and the bracket 42 in turn is mounted onto a leaf spring member 43 that is positioned above the bracket 42. The fastening of the bracket 42 to this leaf spring member can be in any desired manner, for example with fastening devices shown at 44 in FIG. 6. The leaf spring member ends are folded over as shown at 45 and are attached at the front with a bracket 46 and a pin 47. A rear bracket 48 is mounted on the housing and attached to the spring 43 with a pin 50. Thus the leaf spring can move up and down slightly in the center portions thereof to give a spring mounting to the brackets 42, and consequently to the wheels 19 and 20. The brackets 46 and 48 are fastened to the wall of the housing 18 in any desired manner.

The brackets 42 also support the respective drive motors and other driving components for each of the wheels, and it is to be understood that the wheels 19 and 20 are independently driven and independently mounted.

The motor 53, which is typical, is mounted with a suitable strap or other means to the bracket 42, as shown at 54. This electric motor is a variable speed DC motor that is electrically driven, and it has an output shaft that drives a timing belt pulley 55 on the outer end of its output shaft. The pulley in turn drives a timing belt 56 that is mounted onto a timing belt pulley 57. The timing belt pulley 57 is mounted onto an idler shaft 58 that is rotatably mounted in suitable bearings in the opposite legs of the bracket 42, and which is positioned above the top of the wheel 19 (or the corresponding wheel 20 for the other side). The timing belt pulley 57 is drivably mounted onto the shaft 58, and has a sprocket 59 drivably mounted thereon which is positioned on the opposite side of the wheel from the pulley 58, and is between the legs of the bracket 42.

A chain 62 drivably mounted onto the sprocket 59 and extends down to a large sprocket 63 that is drivably mounted onto the axle 41 mounting the wheel 19. Thus when the motor 53 is driven, the V-belt 56 is driven, sheave 57 is rotated, shaft 58 is thus rotated and the chain 62 and sprocket 63 are driven to rotate the wheels. The ends of the shaft 41 may be either fixed with the wheel rotatably mounted thereon or the shaft may be mounted on bearings in the legs of bracket 42.

Both the motors 53 and the motor 53A for the opposite wheel 20 are mounted in the same identical manner.

Figure 5:
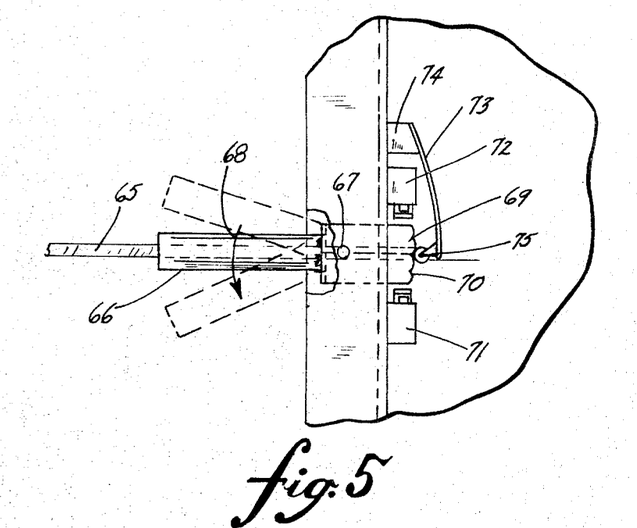
FIG. 5 is a fragmentary enlarged view showing an electrical control apparatus for accomplishing steering.

Each of the motors receive power from the battery mounted in the battery cage, and the control to the motor is through electrical circuitry. The speed control for the motors is carried out with a rheostat, and the steering for the power unit is accomplished by driving one or the other of the wheels 19 or 20 in response to movement of a single control cord 65 which extends outwardly from a guide member 66 that is pivotally mounted onto the housing 18 about an upright axis with a pin 67 so that it can swivel about this pin in direction as indicated by the arrow 68. The guide 66 is tubular, so that the cord 65 can pass through it. In addition, the guide 66 has a switch actuator 69 attached thereto and extending into the housing as shown in FIGS. 5 and 6, and the outer end of this actuator 69 has detent notches 70 defined therein. A detent pin 75 is mounted onto the housing 18 in a suitable manner so that it resiliently holds the actuator and the guide rod in one of three detented positions. The actuator will either be in a center detented position as shown in solid lines in FIG. 5, or in one of the dotted line positions on opposite sides in response to movement.

A pair of microswitches 71 and 72, respectively, are mounted to the housing 18 on opposite sides of the actuator 65 and have actuator buttons as shown in FIG. 5 positioned to be contacted by opposite sides of the actuator 69 whenever the actuator is shifted to one of its detented positions. The detent pin 75 is mounted onto a spring 73 that in turn is attached with a block 74 to the frame of the power unit so the pin can be resiliently urged out of the way.

Figures 1, 2:
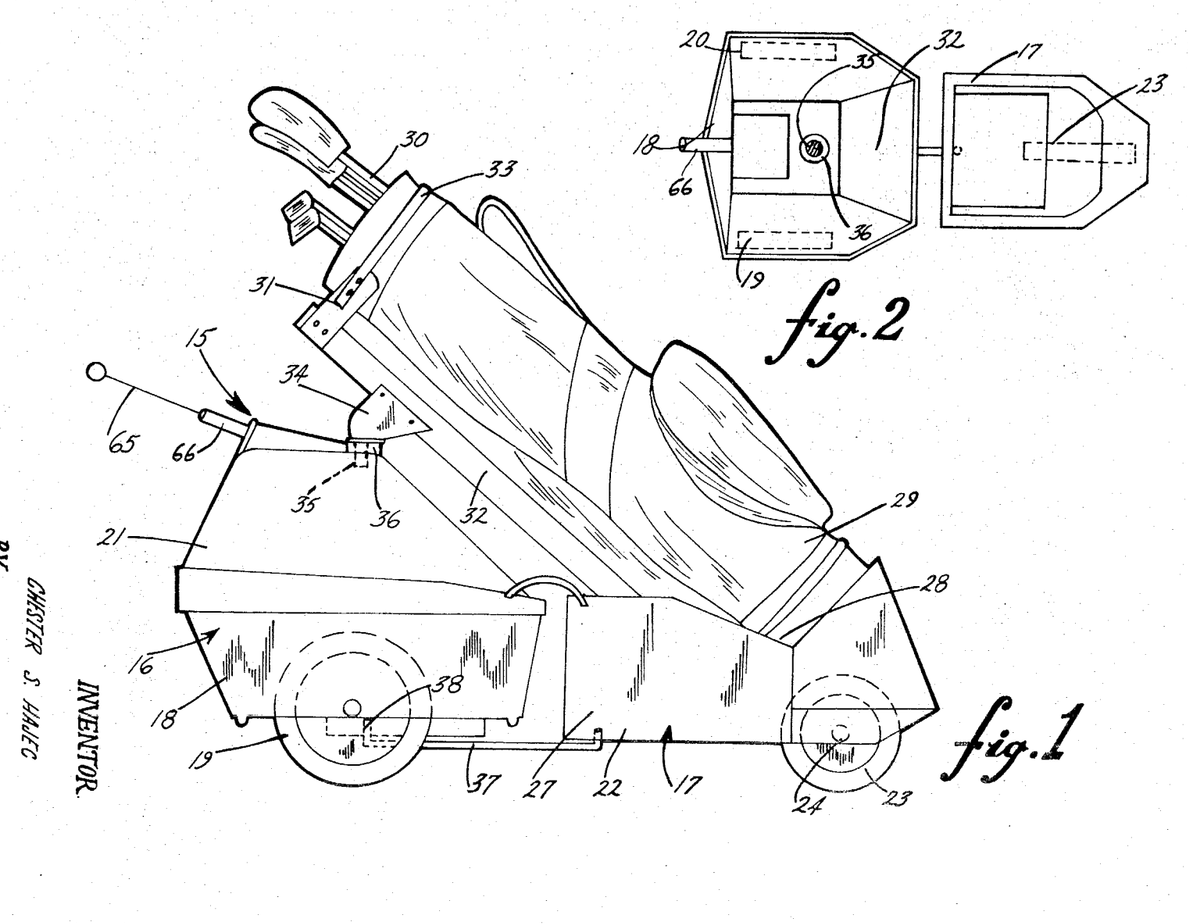
FIG. 1 is a side elevational view of a motorized cart made according to the present invention.
FIG. 2 is a top plan view of the device of FIG. 1 with parts removed for sake of clarity.
Figure 1:
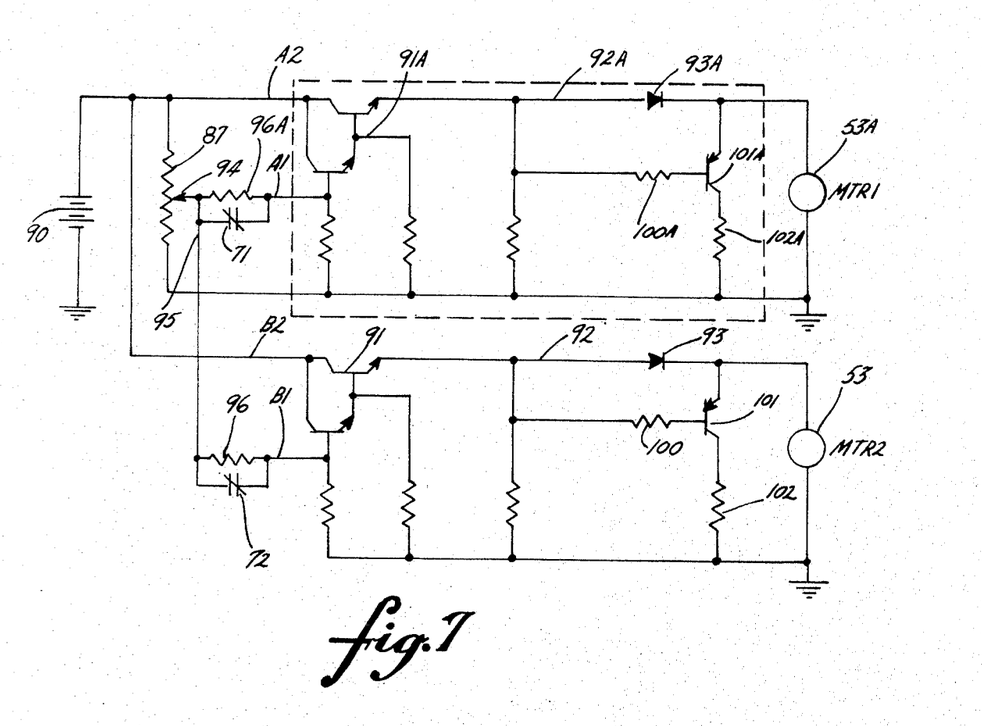
Figure 3:
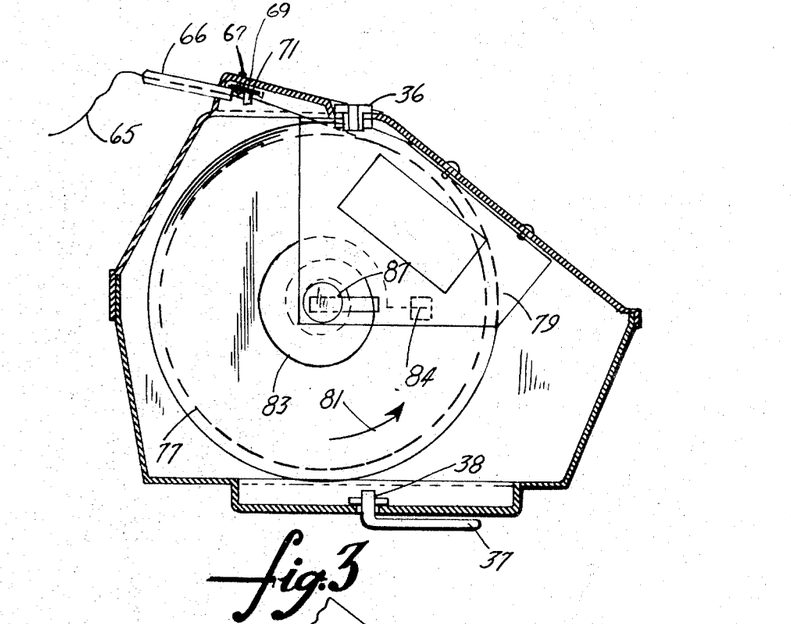
FIG. 3 is a sectional view taken as on line 3—3 in FIG. 6.

As shown, the cord 65 extends through the tubular guide 66 into the interior of the power unit housing 18, and is wrapped around the periphery of a sheave-like pulley 77 and is fastened to the sheave or pulley 77. The pulley is in turn drivably mounted onto a shaft 78. The shaft 78 is rotatably mounted between a suitable bracket 79 and a support post 80. As shown, the sheave 77 is large in diameter and has a V groove in its periphery in which the cord 65 will nest. When the cord 65 is pulled it will tend to rotate the sheave 77 and shaft 78 about the axis of the shaft 78 in direction as indicated by arrow 81 (FIG. 3). One end of a torsion spring 83 is attached to the shaft 78, and the other end is fixed as at 84 to the bracket 79 with a tab. This torsion spring 83 tends to resist rotation of the sheave in direction as indicated by arrow 81 and will return the sheave 77 to a central neutral stopped position. Any movement of the sheave about its axis will tend to return the sheave to its centered position. The end of the shaft 78 passes through the bracket 79, and is attached to a light compression coil spring 85 that in turn is attached to the actuating shaft 86 of center tap rotary potentiometer 87. The potentiometer in turn is used for the start-stop and speed control of the motors 53 and 53A, and thus as the shaft 78 is rotated from center position, the motors will first start and then their speed will increase. The cord 65 which is attached to or carried by a walking person, will unreel more as the distance between the trailing cart and the person increases and as the sheave rotates more, the speed of the cart will increase. As the cart approaches the person, of course the reel 77 will retract under spring pressure, reducing the setting of the rheostat 87, and correspondingly slowing the speed of the drive motors. A main on-off power switch also may be in the circuit.

The steering of the vehicle is accomplished electrically by a differential action between the circuits for the drive motors. Referring now to FIG. 7 and a schematic diagram of the electrical drive circuit, a better understanding of the steering and motor actuation will be had.

The power source is a battery 90 which usually is 12 volts, and as can be seen this is coupled through two control circuits to the motor 53, and to the motor 53A which is used to drive wheels 19 and 20.

The control circuits are identical, and operate through a pair of transistors connected in a transistor multiplier amplifier arrangement shown at 91 and 91A. Output from the amplifiers is carried on lines 92 and 92A through diodes 93 and 93A, respectively, to the respective motors. The base voltage on the bottom transistor in the amplifier shown together at 91 is controlled through the rheostat 87. The rheostat has an off position, and a wiper member 94 which is moved when the pulley 77 is rotated. The wiper will move away from the off position, and a voltage will be applied through the wiper to line 95 and through the normally closed microswitches 71 and 72, respectively. The connection through the switches 71 and 72 will place the voltage signal from the wiper on the bases of the lower transistors in the transistor amplifier arrangements 91 and 91A. The base voltage turns these transistors on to conduct a current through the lines 92 and 92A to drive the motors 53 and 53A in the usual manner and at a speed proportional to the voltage on the wiper 94. Suitable resistors are connected in the circuit so that current flow is proper. The speed of the motors 53 and 53A will then depend on the current in the lines 92 and 92A which in turn is controlled through the amplifier controlled by voltage on wiper 94. The wiper is actuated by the sheave 77 which drives the wiper of rheostat 87. The more the sheave 77 is unreeled, the faster the motors 53 and 53A will go. These motors thus are hooked together and will operate simultaneously as shown.

Then, if the operator starts to move in a different direction the cord 65 will follow the operator and the tubular guide member 67 will swivel from the pulling of the control cord to one of its dotted line positions. The actuator member 69 will contact one of the microswitches. For example, if the turn is to the right or to the top of the paper as shown in FIGS. 5 and 6, the actuator 69 would move to its detented position and contact the microswitch 71. This will open the microswitch 71. This immediately then cuts the voltage to the base of the amplifier 91A because the open switch connects the base of the lower transistor to the wiper through the resistor 96A. This cuts down the voltage at the base of amplifier 91A substantially. This in turn will result in cutting down the conduction of the amplifier and there will be a substantial drop in the current on line 92A, while the current in line 92 remains the same. Motor 53A will immediately slow down because of the drop in drive current, and motor 53 will continue to drive as before. This will cause the unit to turn to the right because the left hand wheel 19 will continue to drive the normal speed while the right hand wheel 20 will slow down.

If turning is to the opposite direction, the opposite result will be achieved. Namely, the guide 67 will move to the dotted line position so that the actuator 69 opens microswitch 72. This will then immediately slow down the motor 53 by reducing the voltage on the base of the lower transistor of amplifier 91 and reducing the current in line 92 while the motor 53A continues to travel at its same rate. This will cause turning of the drive unit in the opposite direction.

The speed again is proportional to the amount that cord 65 extends. Thus the speed increases or decreases as the operator's speed increases or decreases. The spring 85 connected between shaft 78 for sheave 77 and shaft 86 for the potentiometer prevents hunting of the drive because the spring will absorb small movements of the cord 65 without changing the setting of the potentiometer. This smooths the operation of the unit.

When the cord 65 retracts so that the sheave 77 goes to its off position where the voltage at wiper 94 is ground level under the spring load of the torsion spring 83, the motors 53 and 53A will tend to coast because of the load from the power unit and from the golf clubs being carried. This will then tend to overrun the motors 53 and 53A, which generate a small current because of the permanent magnet type motors utilized for variable speed. The diodes 93 and 93A will prevent any current from going back through the transistors in the amplifiers 91 and 91A, but there will be a current through resistors 100 or 100A due to the motor generated voltage on the emitter of transistors 101 or 101A, which will cause transistors 101 and 101A to conduct, which provide paths through resistors 102 and 102A for the currents generated by the motors 53 or 53A and result in dynamic braking. Thus the cart will not roll freely but will be stopped with electrical dynamic braking.

The controls for the unit are thus all electrical, including the speed which is dependent upon the extension of the cord 65 with respect to the frame 18 which in turn controls the sheave 77. Also the steering is controlled by electrical switches that act on the circuit to cause a differential speed between the drive motors for the wheels 19 and 20 and cause positive easily controlled steering through the two drive motors. The use of the single non-castering trailing wheel for supporting the load makes the vehicle horizontally stable and simple to make and does not permit chatter of the unit as it moves down the road. The detenting of the guide member 67 in three positions prevents the steering mechanism from "hunting" and weaving from side to side.

Figure 8:
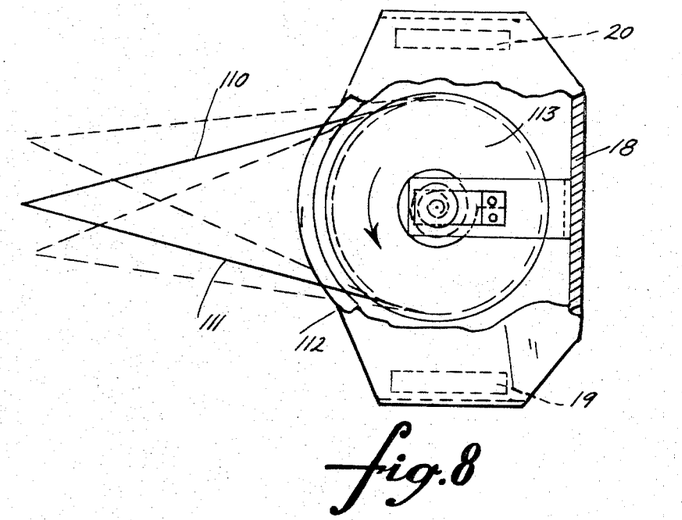
FIG. 8 is a top plan view of a modified form of electrical control of the present invention.
Figure 9:
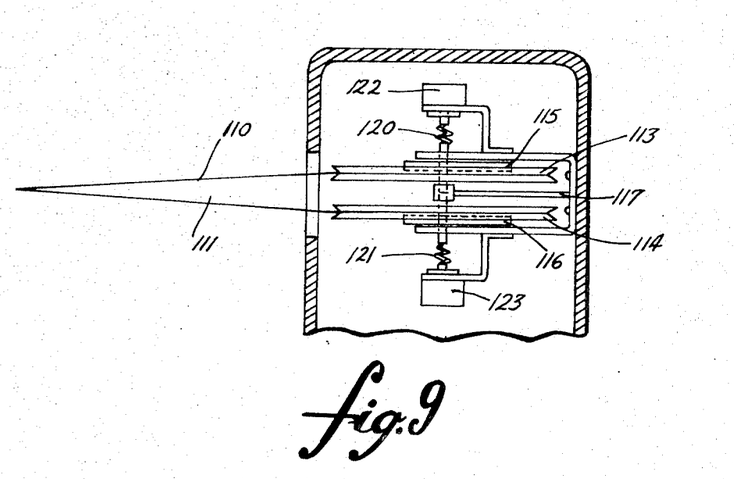
FIG. 9 is a side elevational view of the device of FIG. 8 shown part schematically.
Figure 10:
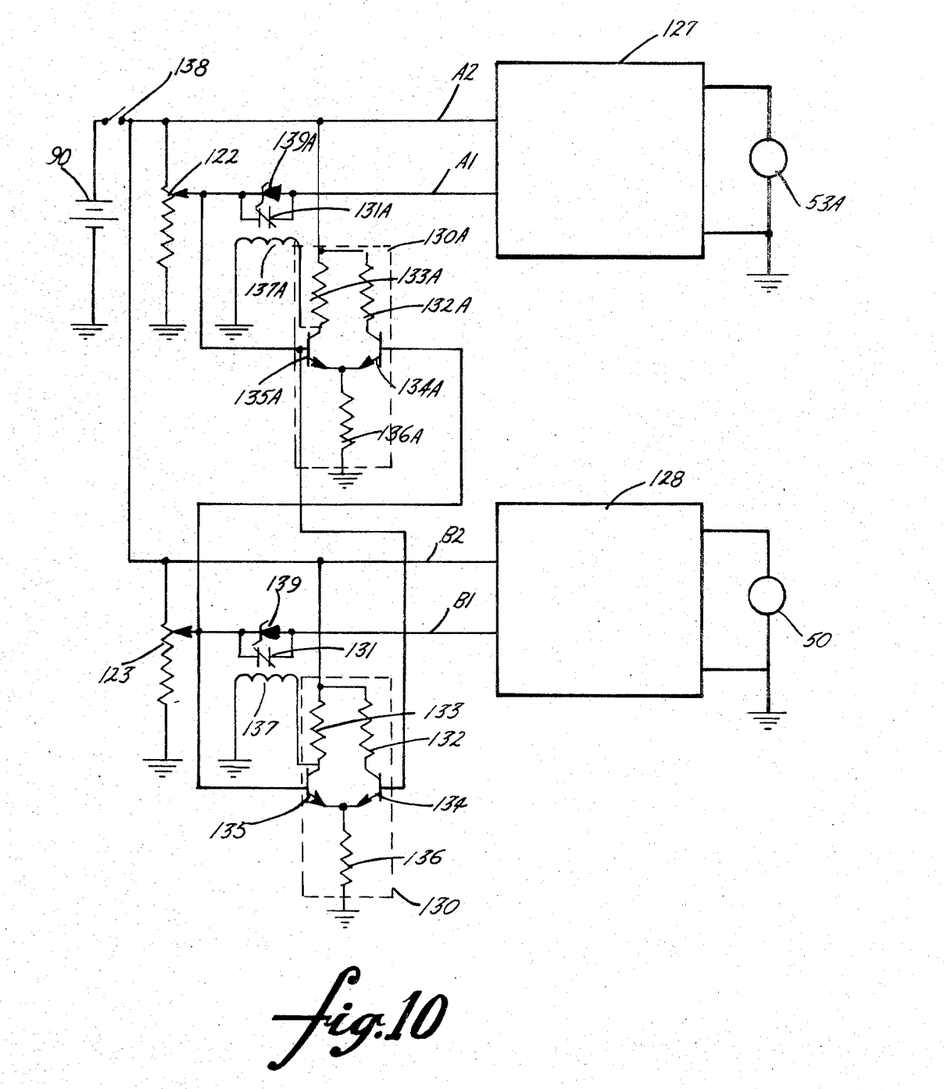
FIG. 10 is an electrical schematic diagram of a second form of the present invention used with the controls of FIGS. 8 and 9.

Referring to FIGS. 8, 9 and 10, a second form of the invention is shown. FIG. 8 is a top plan view showing the outer housing in a slightly modified form. The mounting of the drive wheels 19 and 20 and the power motors 53 and 53A for the wheels is exactly the same as before, as well as the mounting for the trailing unit or load carrying unit. However, the control of the drive motors is changed somewhat. In place of a single sheave or pulley operating one rheostat, the unit uses a double cord control. These cords are shown at 110 and 111, respectively, and extend through an opening 112 in the front of the housing 18. The cords are selected so that they directionally control the opposite drive wheels for the vehicle. In other words, one cord will control the speed of one of the drive motors for one wheel and one cord will control the speed for the other drive motor. The cords in turn are mounted onto sheaves 113 and 114, respectively, which are coaxial, but are drivably mounted on independently rotatably mounted shafts. The sheaves are loaded with suitable torsion springs just shown schematically at 115 and 116, respectively, in the same manner as before. The shafts for the sheaves are mounted in suitable bracket means 117 and the center portion of the bracket rotatably mounts both ends of the individual shafts for the individual sheaves.

At the outer ends of the shafts for the sheaves, separate connecting springs 120 and 121, respectively, are joined to the ends of the shafts for the respective sheaves and in turn the springs 120 and 121 are connected to potentiometers 122 and 123, respectively. The springs are the same as those shown in the first form of the invention at 85, and the torsion springs also are of the same type of construction. Potentiometers 122 and 123 are mounted in suitable brackets and are the rotary type that are driven whenever the shafts for the respective sheaves 113 and 114 are rotated.

The two cords 110 and 111, when they are pulled straight forwardly an equal amount, will pull each of the sheaves 113 and 114, respectively, the same amount, and this as will be explained will control the potentiometers 122 and 123 so the speed of both motors 53 and 53A are the same.

As shown in FIG. 10, the controls to the motors are changed slightly. The motors 53 and 53A are illustrated schematically, and the boxes indicated at 127 and 128 are the same as the portions of the circuits surrounded by dotted lines in FIG. 7. This would include the amplifiers 91 and 91A, lines 92, and 92A, diodes 93 and 93A and the associated dynamic braking circuits.

The direction control to the motor drive circuits is different because now there are two potentiometers that control the device. The potentiometers 122 and 123 are powered through the battery 90 which is the battery carried by the unit, and the change of current to the motor 53 or 53A is controlled through two differential amplifiers outlined by dotted lines at 130 and 130A, respectively. When both of the wiper arms for the potentiometers 122 and 123 are in off position (at the lower end of the resistance), there is no voltage on the wipers. However, as the wipers move away from the off positions and assuming the sheaves 113 and 114 are being advanced equally so the wipers move the same amount, an equal signal is present at both wipers. Contacts 131 and 131A of the control relays are normally closed, and the voltage signal is carried through these contacts into the motor circuits 127 and 128 so that both of the motors 53 and 53A are driven at the same speed. The lines $A_1$, $A_2$ and $B_1$, $B_2$ correspond to the like designated lines in FIG. 7. The amount of the wipers of potentiometers 122 and 123 determine the speed at which the motors 53 and 53A are traveling. This is just as the previous unit, and the connection from the wiper arms would be to the base of the bottom transistors in the amplifiers 91 and 91A as shown.

In controlling motor 53A a differential amplifier 130 is made up of a pair of resistors 132 and 133, connected respectively to the collectors of transistors 134 and 135, respectively, and the emitters of the transistors 134 and 135 feed through a resistor 136 to ground. The resistors 132 and 133 are connected to a line leading from power. It can be seen that the relay coil 137 controlling contact 131 is connected to the battery 90 through the resistor 133. The bases of the transistors 134 and 135 are connected to the wipers of the potentiometers 122 and 123, respectively. Further, the coil 137 of the relay 131 is connected to the collector side of the transistor 135 between the transistor 135 and the resistor 133. The base of transistor 134 is connected to the wiper of potentiometer 122. The relay coil 137 controls normally closed contacts 131 and when the voltage from the wiper on 123 is equal to or above the voltage on wiper 122, the transistor 135 will conduct and keep current flow away from the coil 137. The normally closed contacts 131 will stay closed. Then the voltage at the wiper 123 will appear at the base of the amplifier transistors in the motor circuit 128, just as they did with FIG. 7.

The operation of the contacts 131A for motor 53A is exactly the same. The differential amplifier 130 includes transistors 134A and 135A, connected on their collector sides to transistors 132A and 133A. Their emitters are connected through resistors 136A to ground. The base of transistor 135A is connected to the wiper for potentiometer 122, and the base of transistor 134A is connected to the wiper for the potentiometer 123. The coil 137A is connected to the line between the resistor 133A and the collector of the transistor 135A. The normally closed contacts 131A will likewise, therefore, remain closed whenever the voltage on the base of transistor 135A, which is the voltage from the wiper of potentiometer 122, is equal to or above the voltage at wiper 123A, which is coupled to the base of transistor 134A.

Thus for straight ahead going, when both of the potentiometers 122 and 123 are positioned the same, for example, they are both developing equal voltages on their wipers, the motors 53 and 53A will be each driven with equal voltage through the respective normally closed contacts 131 and 131A. As the operator walks faster, the sheaves will move the wipers farther away from the off position and increase the voltage on each of the wipers, and as long as the voltage increase is equal, the motors will both speed up an equal amount so that they continue to drive in a straight line.

If the device is going to turn in direction from the center line toward motor 53A, the cords would be moved so that the sheave 113 would retract slightly relative to the other. Cord 110 would be shortening up with respect to cord 111, which would be increasing in length. This would cause the wiper on potentiometer 122 to move toward a lower setting position (shown in dotted lines) and drop the voltage on the base of transistor 135A (and also on the base of transistor 134, which does not affect the operation of the differential amplifier 130). This voltage drop means that the transistor 135A no longer conducts and the current through resistor 133A is conducted through the coil 137A, energizing the relay and opening the normally closed contacts 131A. This would break the circuit through contacts 131A directly coupling the voltage at wiper of potentiometer 122 to the base of the lower transistor in amplifier 91A in the motor circuit. The signal from the potentiometer wiper 122 then must go through Zener diode 139A which would reduce the voltage on the base of the bottom transistor of the amplifier 91A in the motor circuit for motor 53A, reducing the speed of the motor 53A. Motor 53 will continue rotating at the same speed (or slightly faster if cord 111 was extended more), to follow the operator around. The transistor 135 will continue to conduct unless the voltage at the base of transistor 135 drops equal to or below the voltage at the base of transistor 134. The control signal for the motor 53 will be coming through the normally closed contacts 131.

In opposite direction of turn, the opposite action takes place. The lengthening of the cord 110 and/or shortening of cord 111 will cause the sheave 113 to rotate further and the sheave 114 to retract because of the retraction of the cord 111. The retraction of sheave 114 will reduce the voltage on the wiper of potentiometer 123 below the voltage on the wiper for potentiometer 122, which in turn will turn off the transistor 135. The shutting off of transistor 135 will then cause current to flow to energize the coil 137, opening the contacts 131 and dropping the voltage on the motor 53 to cause this wheel to slow down while the other wheel 53A keeps going at the same speed as previously and cause the vehicle to turn in the direction of movement of the outer ends of the cords 110 and 111.

Again, straight out pulling of the two cords 110 and 111 when there are balanced voltages on the potentiometer wiper arms, after the unit has straightened out again, will result in both relays being unenergized with the contacts 131 and 131A closed, so that the voltage signals from the wiper arms are then directly applied to the base of the lower amplifier transistors in the motor circuit. The overrunning or self-braking action of the motors of course is the same as in the previous form of the invention.

Here again, there is a cord control which the operator can place in his pocket, tie around his waist or hold in his hand, and the vehicle will merely follow him at proper speed, depending upon the amount of extension on the cord, and here the steering direction is dependent upon the differential in extension between two sheaves operating on center tap potentiometers. The speed control is stepless and continuous. The steering is positive, and the unit will follow closely behind the cord carrying operator at the desired rate of speed.

The differential amplifiers could be replaced with mechanical motion amplifiers to multiply the differential in movement between the two sheaves, and then controlling the speeds of the motor directly from the mechanical movement amplifiers. Thus the term differential amplifier means is to be interpreted to include motion amplifiers.

What is claimed is:

1. A cart drivable under power comprising a carriage having at least two surface engaging drive means spaced apart on said carriage, power means to drive said surface engaging drive means for movement over a surface comprising separate power driven motor means for each of said drive means, speed control means including a continuously rotatable variable power control element means for varying power to said motor means to change the speed of operation of said motor means, at least one pulley member rotatably mounted on said carriage, bias means urging said pulley member to rotate to a first position, flexible line means mounted on said pulley and rotating said pulley upon extension of said line means, said line means having an outwardly extending portion controlled by a user of the cart, means drivably connecting said variable power control element means to the pulley to rotate as said pulley rotates to control power directly responsive to the amount of extension of said line means from said cart to continuously change the power to said motor means and change the speed of operation of said motor means as a function of the amount of extension of said line means, and steering control means responsive to the lateral position of said flexible line means relative to a reference axis extending in direction of normal straight ahead movement of said carriage, said steering control means including steering control elements movable by said flexible line means and operative to change the effective drive speed of at least one of said motor means to its surface engaging drive means relative to the other coordinated to the direction of movement of said flexible line means with respect to said reference axis to provide differential drive speed steering action resulting in a change of direction of movement of said carriage in the direction of movement of said flexible line means from said reference axis, whereby the flexible line means controls both speed and steering of said carriage by regulating the effective output speed of the motor means to the surface engaging drive means.

2. The combination as specified in claim 1 wherein said line means comprise a pair of lines, and said continuously variable control element means comprises a pair of control elements each responsive to position of one of said lines with respect to said carriage means and said control elements individually controlling speed of operation of the respective motors in response to differential extension of the lines to provide steering action due to different rotational speeds of said drive wheels.

3. The combination as specified in claim 2 wherein said variable speed control element means comprises a pair of variable resistances, each of said variable resistances being coupled to control a separate motor, and a separate one of said lines controlling each variable resistance.

4. The combination as specified in claim 3, wherein said motors are electric motors and said steering control means responsive to movement of said line means with respect to the reference axis of movement of said cart comprises differential amplifier means responsive to differences in potential on the variable resistances leading to each of said motors, whereby a drop in potential on one of said variable resistances to one of said motors causes a circuit to open coupling a voltage drop element between said one variable resistance and said one motor to reduce the voltage signal on said one motor a predetermined amount.

5. The combination as specified in claim 4 and means to amplify differentials in movement between said two cords to provide usable control signals to control each of said motor means when said control elements move different amounts with respect to a reference point.

6. The combination as specified in claim 1 wherein said motor means are electrically controlled motors, and said variable control element means comprises variable resistance means for changing the electrical signals energizing said motor means.

7. The combination as specified in claim 6 and spring drive means between said pulley member and said variable resistance means to drive said variable resistance means, and absorb small movements of said pulley member.

8. The combination as specified in claim 1 and a trailing load support member mounted on said carriage for movement therewith, said load support member being pivotally mounted to said carriage about an upright axis, said load support member having wheel means thereon trailing said carriage.

9. The combination as specified in claim 8 wherein said load support member is pivotally mounted to said carriage means adjacent the upper portions of said carriage means, and a second reinforcing strap pivotally mounted at one end thereof to said carriage means at one and pivotally mounted to said load support means at the other end thereof and is adjacent the lower portions of the carriage means.

10. The combination as specified in claim 1 wherein the line means comprise two lines, and there are two pulley members, each of said lines being individually mounted about one pulley, said motors being electric motors and said variable power control element means comprising separate variable resistors, each controlling speed of one motor, and each of said pulleys controlling the setting of one of said variable resistors.

11. A cart drivable under power comprising a carriage having first surface engaging drive means, power means to drive said surface engaging drive means for movement over a surface comprising separate power driven motor means for each of said drive means, control means including a continuously variable power control element means for varying power to said motor means, retracting flexible line means on said carriage having an outwardly extending portion controlled by a user of the cart, said variable power control element means being responsive to the amount of extension of said line means from said cart to continuously change the power to said motor means and change the speed of operation of said motor means in proportion with the extension of said line means, and a line guide means pivotally mounted about a generally upright axis on said carriage means, said flexible line means passing through said line guide means, steering control means to change the speed of one or the other of said motor means responsive to pivoting of said line guide means to either side about said upright axis, and detent means to resiliently retain said line guide means in one of a plurality of predetermined positions about its axis.

* * * * *